(12) United States Patent
McMurtrey et al.

(10) Patent No.: US 6,511,601 B2
(45) Date of Patent: Jan. 28, 2003

(54) METHOD AND SYSTEM FOR EXTRACTION OF CHEMICALS FROM AQUIFER REMEDIATION EFFLUENT WATER

(75) Inventors: Ryan D. McMurtrey, Idaho Falls, ID (US); Daniel M. Ginosar, Idaho Falls, ID (US); Kenneth S. Moor, Idaho Falls, ID (US); G. Michael Shook, Idaho Falls, ID (US); Donna L. Barker, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 14 days.

(21) Appl. No.: 09/823,026

(22) Filed: Mar. 29, 2001

(65) Prior Publication Data

US 2002/0011442 A1 Jan. 31, 2002

Related U.S. Application Data

(60) Provisional application No. 60/194,323, filed on Apr. 3, 2000.

(51) Int. Cl.[7] ............................................... B01D 11/00
(52) U.S. Cl. ..................... 210/634; 210/639; 210/747; 210/774; 210/805; 210/170; 210/177; 210/194; 210/511; 166/267
(58) Field of Search ................................ 210/170, 175, 210/177, 194, 511, 634, 639, 747, 770, 774, 805, 808; 166/267, 270.1, 270.2, 370; 134/10

(56) References Cited

U.S. PATENT DOCUMENTS

| 4,547,292 | A | | 10/1985 | Zarchy |
| 4,568,447 | A | * | 2/1986 | Pujado et al. ............... 210/634 |
| 4,929,348 | A | | 5/1990 | Rice |
| 4,956,052 | A | | 9/1990 | Hirata et al. |
| 5,197,541 | A | * | 3/1993 | Hess et al. .................. 166/267 |
| 5,993,660 | A | * | 11/1999 | Shook et al. ............... 210/747 |
| 6,146,533 | A | * | 11/2000 | Nakai et al. ................ 210/634 |
| 6,312,528 | B1 | * | 11/2001 | Summerfield et al. ........ 134/10 |
| 6,402,952 | B2 | * | 6/2002 | McMurtrey et al. ........ 210/634 |

* cited by examiner

Primary Examiner—Joseph W. Drodge
(74) Attorney, Agent, or Firm—Workman Nydegger & Seeley

(57) ABSTRACT

A method and system for extraction of chemicals from an groundwater remediation aqueous effluent are provided. The extraction method utilizes a critical fluid for separation and recovery of chemicals employed in remediating groundwater contaminated with hazardous organic substances, and is particularly suited for separation and recovery of organic contaminants and process chemicals used in surfactant-based remediation technologies. The extraction method separates and recovers high-value chemicals from the remediation effluent and minimizes the volume of generated hazardous waste. The recovered chemicals can be recycled to the remediation process or stored for later use.

35 Claims, 7 Drawing Sheets

METHOD AND SYSTEM FOR EXTRACTION OF CHEMICALS FROM AQUIFER REMEDIATION EFFLUENT WATER

RELATED APPLICATION

This application claims priority from United States provisional application Ser. No. 60/194,323 filed Apr. 3, 2000, and is incorporated by reference.

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

The present invention relates generally to methods for remediation of polluted bodies and sources of groundwater. More particularly, the present invention relates to a method and system for extraction of chemicals such as non-aqueous phase liquids from surfactant-based groundwater remediation effluent water.

2. Background Technology

Contamination of groundwater with liquid organic contaminants such as nonaqueous phase liquids (NAPL), including dense nonaqueous phase liquids (DNAPL) and/or light nonaqueous phase liquids (LNAPL), plagues sites in both the public and private sectors. For example, for many years little care was taken in the handling of organic solvents and other contaminants which were used in industry and at government installations, such as military bases. Through poor handling techniques and occasional intentional dumping, many industrial sites and military bases now have contaminated areas containing relatively high concentrations of contaminants such as chlorinated solvents or other organic liquids. If not removed, such contaminants can filter down into groundwater supplies, rendering the water unfit for consumption and other uses.

Such groundwater contamination is fairly common in groundwater sites, which are permeable bodies of rock that are capable of yielding quantities of groundwater to wells and springs. The Environmental Protection Agency (EPA), Region I, recently identified 20 groundwater sites requiring remediation, with an additional 10,000 contaminated groundwater sites believed to exist nationwide at industrial, municipal, and military installations.

Several methods have been tested at various scales to determine their effectiveness in removal of organic contaminants from groundwater, and several techniques, both in situ and ex situ, are currently employed for remediating contaminated groundwater. To date, most of these have been pump-and-treat methods where DNAPL liquids are involved. In such a method, wells are drilled into the contaminated area and contaminated groundwater is pumped above the surface, where it is treated to remove the contaminants. Such pump-and-treat methods typically suffer from low process efficiency due to the relatively low solubility of DNAPL in the groundwater and resulting long clean-up time.

Due to the general impractability of pump-and-treat methods, other technologies have been developed which utilize a process commonly referred to as enhanced solubilization. Such a process uses micellar surfactant solutions to increase the effective solubility of the dense non-aqueous contaminants to accelerate the rate of removal. The mechanism for solubilization displayed by surfactants arises from the formation of microemulsions by the surfactants, water, and the solubilized dense non-aqueous liquid molecules.

One such technology is surfactant enhanced groundwater remediation (SEAR), which is particularly effective in the removal of chlorinated contaminants such as trichloroethylene (TCE) and perchloroethylene (PCE) from contaminated groundwater. In the SEAR process, a surfactant and other process chemicals such as a thickener and alcohol are injected into a contaminated groundwater to enhance solubility of the organic contaminants. Following dissolution, the contaminants, surfactant, and other process chemicals are pumped back to the surface where the chemicals are stripped, and treated water is reinjected to the groundwater. The SEAR process is particularly suited to remediation of groundwater in groundwater sites having an aquiclude such as a clay layer, which prevents downward vertical migration of solubilized organic contaminants. While the SEAR process is effective in clean-up of source contamination, the process is not an endpoint for water treatment, but rather is primarily useful in the removal of concentrated contaminants.

The SEAR process generates effluent water containing high concentrations of PCE, TCE, surfactant, and other process chemicals. Typical TCE/PCE concentrations in the SEAR effluent range as high as 5000 ppm. Alcohol and surfactant concentrations may reach up to 12% and 4%, respectively. Effluent treatment is a significant cost burden to the SEAR process, with up to 40% of the total SEAR process cost arising from effluent treatment.

A related technique is surfactant enhanced groundwater remediation at neutral buoyancy (SEAR-NB), which is an enhanced pump-and-treat method for remediation of TCE and PCE contaminated groundwater that is disclosed in U.S. Pat. No. 5,993,660 to Shook et al. In this process, surfactant, alcohol, and other components injected into a contaminated groundwater, are optimized to provide a microemulsion with a substantially neutral buoyancy with respect to the groundwater. Thus, the SEAR-NB process is particularly suited to remediation of groundwater in groundwater sites that do not have an aquiclude to prevent downward vertical migration of solubilized contaminants.

Considerable chemical cost is associated with the SEAR-NB process. Significant capital and operating costs are associated with the operation of a SEAR-NB effluent treatment plant. Effluent treatment currently accounts for approximately 50% of the total cost of the SEAR-NB process, not including costs associated with the loss of high value chemicals. Such loss of high value chemicals has a significant detrimental impact on the overall economics of the SEAR-NB process.

Extraction of organic compounds from water using critical fluids and direct extraction of DNAPLs from solids have been previously demonstrated. For example, critical fluid extraction has proven an effective method for removal of organics from contaminated soils and regeneration of activated carbon. Techniques have also been developed for extraction of various hydrocarbons and other contaminants from aqueous solution. CF Technologies (Hyde Park, Mass.) has demonstrated steady state extraction of various organic compounds from wastewater with efficiencies in excess of 99% in a continuous extraction system. Extracted compounds have included acetone, methylene chloride, trichloroethylene, toluene, and methyl methacrylate.

Several technologies, including activated carbon adsorption, steam stripping, and membranes have been explored to determine their effectiveness in separation of DNAPLs and process chemicals from the SEAR or SEAR-NB effluent. These technologies are typically effective in removal of TCE and PCE from the effluent, but often result in destruction and loss of process chemicals.

Activated carbon, although effective in removal of organic contaminants from aqueous solution, is most effective in treatment of dilute, less than 1%, process streams. As the SEAR or SEAR-NB processes generate an effluent stream with relatively high total organic content, in excess of 16%, large volumes of granulated activated carbon (GAC) would be required to enact the separation. The large consumption of GAC would result in generation of a large volume of secondary waste requiring regeneration or incineration. GAC adsorption would ultimately result in SEAR or SEAR-NB process chemical destruction.

Although, steam distillation or stripping can separate PCE, alcohol, and surfactant from aqueous solution, the surfactant is generally damaged by the high temperature operation and cannot be reused. Foaming of the surfactant during distillation can also occur, making the separation impossible. Steam distillation would also be costly due to large energy requirements to enact the desired separation.

In the SEAR or SEAR-NB processes, a micro-emulsion is formed in which surfactant molecules surround molecules of PCE in the contaminated groundwater in micellular fashion. These micelles are then solubilized into the aqueous phase and pumped out of the groundwater with the alcohol/surfactant/water flood. Membranes, although capable of enacting the separation of highly dilute DNAPL from water, are generally not capable of breaking micellular microemulsions such as those encountered in the SEAR or SEAR-NB processes. To enact a separation, the membrane must have access to the material to be removed. Therefore, before a membrane could be used to separate PCE from aqueous solution, the emulsion must first be broken. This typically requires further chemical addition or thermal destruction of the surfactant. Membrane treatment technologies are particularly sensitive to the presence of suspended solids and would require pre-filtering of effluent prior to treatment. In the presence of suspended solids, membrane flux rate is significantly reduced through plugging of the pores.

Thus, there is a need for improved methods of extracting process chemicals and contaminants from groundwater remediation effluent water.

SUMMARY OF THE INVENTION

The present invention provides a method and system for extracting non-aqueous phase liquids from groundwater remediation effluent water.

The present invention provides a method and system for extracting remediation process chemicals from groundwater remediation effluent water, which allows for reuse of the process chemicals in the remediation process.

The present invention also provides a critical fluid extraction method for separation and concentration of hazardous materials and high-value chemicals.

The present invention further provides a critical fluid extraction method which is a viable alternative for waste minimization and volume reduction in handling of SEAR or SEAR-NB process effluent.

The invention yet further provides a critical fluid extraction method which allows for process chemical recovery and recycle to reduce the environmental impact and cost of the SEAR or SEAR-NB process In accordance with the invention as embodied and broadly described herein, a method and apparatus are provided for extraction of chemicals from an groundwater remediation aqueous effluent. The extraction method utilizes a critical fluid for separation and recovery of chemicals employed in remediating groundwater contaminated with hazardous organic substances, and is particularly suited for separation and recovery of process chemicals used in surfactant-based remediation technologies such as the SEAR or SEAR-NB process. The extraction method separates and recovers high-value chemicals from the remediation effluent and minimizes the volume of generated hazardous waste. The recovered chemicals can be recycled to the remediation process or stored for later use.

In one aspect of the invention, a method for extraction of chemicals from an groundwater remediation aqueous effluent comprises contacting a critical fluid with an aqueous effluent including water and a plurality of chemical components in a first stage at a preselected first temperature and first pressure. At least one of the chemical components is thereby substantially dissolved in the critical fluid. The critical fluid having at least one of the dissolved chemical components is then separated from the aqueous effluent. After the separation, additional critical fluid is contacted with the remaining aqueous effluent in one or more additional stages, with at least one of the first temperature and first pressure being adjusted at each stage, so as to sequentially remove each of the remaining chemical components from the aqueous effluent at each stage.

In another aspect, one embodiment of an extraction apparatus is provided for implementing the method of the invention. The extraction apparatus is a series column system which is particularly suited for performing critical fluid extraction of DNAPL and process chemicals from SEAR or SEAR-NB process effluent. The extraction apparatus includes a three column or tower extraction cascade in which dissolved components are selectively and sequentially removed and recovered from the SEAR or SEAR-NB process effluent.

These and other features and advantages of the present invention will become more fully apparent from the following description and appended claims.

BRIEF DESCRIPTION OF THE DRAWINGS

In order to illustrate the manner in which the above-recited and other advantages of the invention are obtained, a more particular description of the invention briefly described above will be rendered by reference to specific embodiments thereof which are illustrated in the appended drawings. It should be understood that these drawings depict only typical embodiments of the invention and are not to be considered limiting of its scope, the invention will be described and explained with additional specificity and detail through the use of the accompanying drawings in which.

DETAILED DESCRIPTION OF THE INVENTION

The invention is directed to a critical fluid extraction method and apparatus for separation and recovery of chemicals employed in remediating groundwater contaminated with hazardous organic substances. The present extraction method separates and recovers high-value chemicals from the remediation effluent and minimizes the volume of generated hazardous waste. The recovered chemicals can be recycled to the remediation process or stored for later use. The extraction method is particularly suited for separation and recovery of process chemicals used in surfactant-based remediation technologies such as the SEAR or SEAR-NB processes, which can be employed in the removal of liquid organic contaminants such as DNAPL and LNAPL from groundwater in groundwater sites.

Figure 1:
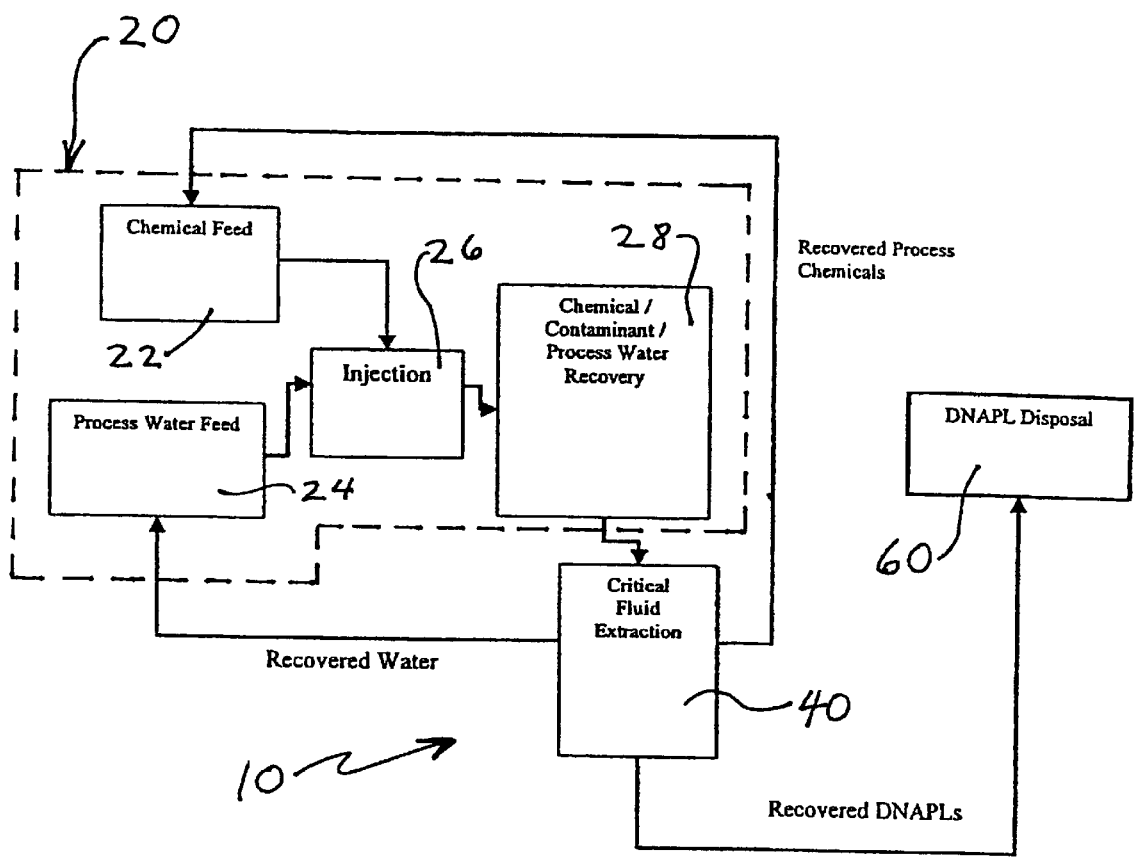
FIG. 1 is a schematic representation of an groundwater remediation and effluent treatment system and method according to the present invention.

Referring to the drawings, FIG. 1 is a schematic block diagram of an effluent treatment system 10 employing the critical fluid extraction (CFE) method of the present invention for chemical recovery and recycle in an enhanced solubilization process such as a SEAR or SEAR-NB process. The effluent treatment system 10 is implemented as part of an groundwater remediation system 20, which employs an enhanced solubilization process. The groundwater remediation system 20 generally includes a chemical feed 22, a process water feed 24, and an injection system 26 in fluid communication with both chemical feed 22 and process water feed 24. The injection system 26 is also in fluid communication with one or more injection wells and one or more recovery wells 28 in the contaminated groundwater site, for chemical/process water injection and chemical/contaminant/process water recovery. A critical fluid extraction (CFE) treatment facility 40 is configured to received the chemical/contaminant/process water recovered from the groundwater, and extracted contaminants such as DNAPL or LNAPL are sent to a disposal area 60. Each of these parts of effluent treatment system 10 will be discussed in further detail hereafter.

The chemical feed 22 and process water feed 24 generally include storage facilities such as tanks for holding process chemicals and water for subsequent injection into the groundwater. The process chemicals generally include surfactants, solvents such as alcohols, and thickeners. The surfactants can be a wide variety of anionic or nonionic surfactants. Suitable surfactants include ethoxylates such as nonylphenol ethoxylate, sulfosuccinates such as sodium diamyl sulfosuccinate, sodium dioctyl sulfosuccinate, and sodium dihexyl sulfosuccinate, derivatives thereof, and combinations thereof. For example, blends of nonylphenol ethoxylate and its phosphate ester, and blends of sodium diamyl and dioctyl sulfosuccinates are particularly useful. Suitable solvents include alcohols such as isopropanol or ethanol. Suitable thickeners are water-soluble polymers which increase viscosity of the microemulsion which forms in-situ. A preferred polymer type is a water-soluble biopolymer which is highly biodegradable, such as xanthan gum.

The injection system 26 is configured to receive the process chemicals and water from chemical feed 22 and process water feed 24 for injection into the contaminated groundwater site. The injection system 26 can include a variety of conventional tanks and pumps for receiving and injecting the process chemicals and water as a flood. A typical flood for injection into the groundwater will include, for example, 2% surfactant, 16% alcohol, and 82% water.

Figure 2:
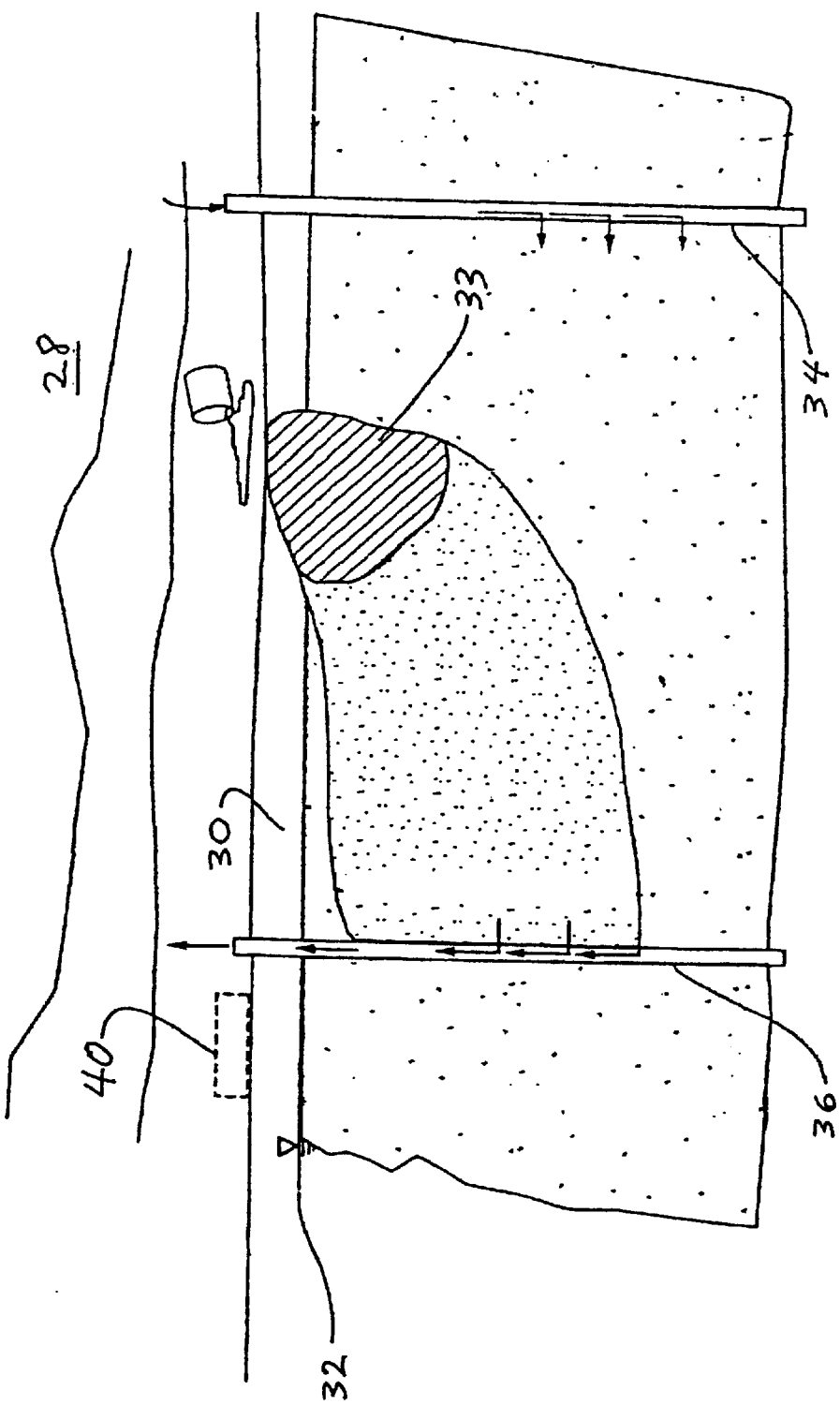
FIG. 2 is a schematic representation of a SEAR-NB process which can utilize the effluent treatment system and method of the present invention.

FIG. 2 is a schematic representation of the contaminated groundwater site 28 including an groundwater remediation system which utilizes an enhanced solubilization process, in particular, the SEAR- NB process as disclosed in U.S. Pat. No. 5,993,660 to Shook et al., the disclosure of which is incorporated by reference herein. The contaminated groundwater site 28 generally includes DNAPL (e.g., perchloroethylene, trichloroethylene, or mixtures thereof), or LNAPL (e.g., kerosene, jet fuel, diesel fuel, gasoline, cleaning solvents, motor oil, lubricating oil, dry cleaning solvents, or mixtures thereof), which have passed through vadose zone 30 in the ground and below water table 32. As the contaminant moves through the porous media of the groundwater, a portion of the contaminant is trapped as a residual saturation 33. An injection well 34 is drilled into the soil adjacent the contaminated site. The well 34 is configured for the introduction into the groundwater supply of a solution containing the process chemicals such as surfactant, alcohol, thickener, etc.

A recovery well 36 is drilled on the opposite side of the contaminated site. The well 36 is configured to withdraw contaminated groundwater and the microemulsion that forms in-situ when the process chemicals solubilize the non-aqueous phase liquid contaminants. The withdrawn contaminated groundwater is then directed to the CFE treatment facility 40 to clean the water and recover the process chemicals.

Those skilled in the art will appreciate that wells 34 and 36 are conventional and are commonly used in contamination removal. It should also be appreciated that while discussed herein as two wells, the number of wells is dependent on the size of the spill and it is not uncommon to have multiple wells formed on opposing sides of the contaminated area. The wells are typically designed to hydraulically contain the groundwater site so as to isolate both vertically and horizontally the area subject to clean-up. In some cases only a single well may be needed for injection and recovery of the process chemicals and ground water.

The CFE treatment facility 40 is configured such that the process chemicals such as the surfactant and alcohol are separated and recovered by critical fluid extraction from the process water. It will be understood by those skilled in the art that a variety of pressure and temperature control devices can be utilized to generate the optimum pressure and temperature conditions during the extraction process. The contaminants such as DNAPL including PCE, TCE, or other chlorinated organics are also selectively extracted, with the recovered DNAPLs being concentrated and sent to disposal area 60.

The recovered water is recycled back to process water feed 24 and the recovered process chemicals are recycled back to chemical feed 22 for reuse. In addition, the critical fluid used in the extraction process can be recycled for reuse in subsequent extraction/chemical recovery processes. Various conventional pump devices and piping configurations can be used in the recycling of effluent components. Such pump devices and piping configurations are examples of a means for recycling the recovered process chemicals, water, and critical fluid. It will be understood by those skilled in the art that a variety of conventional apparatus may be utilized to accomplish this function.

Although FIG. 1 shows a closed loop system, in which the recovered water and process chemicals are recycled, it will be readily apparent that an alternative system of storage for later use or sale could be employed without immediate recycling. In addition, the recovered water could be sent to a standard water treatment plant instead of being recycled into the remediation process.

The critical fluid extraction method utilized in CFE treatment facility 40 takes advantage of variations in component volatilities, solubilities, and densities. The extraction method employs a critical fluid, which can be various compounds such as carbon dioxide ($CO_2$), propane ($C_3H_8$), $CH_3F$, $CHF_3$, $C_2H_6$, $SF_6$, methane $CEH_4$, natural gas, phenol, toluene, butane, ammonia, or other hydrocarbon critical fluids, or combinations thereof. The critical fluid is preferably selected so as to be nontoxic with the environment. Carbon dioxide and propane are particularly useful as critical fluids in the present invention due to their nontoxic nature, low critical temperature and pressure, strong solvating power in the critical phase, and low cost. The term "critical fluid" as used herein means any fluid which is in a near-critical, critical, or supercritical state.

Generally, the critical point of a fluid is defined by a critical pressure ($P_c$) and by a critical temperature ($T_c$). The term "near-critical" liquid as used herein refers to all pressures corresponding to a liquid phase in the temperature range of about 0.9 to about 1 $T_c$, where $T_c$ is referred to on an absolute temperature scale such as degrees Kelvin (K). The term "near critical" gas as used herein refers to all pressures corresponding to a gas phase from 0.25 to 1.0 $P_c$ and temperatures greater than 0.9 $T_c$. The term "critical" is used herein to characterize a pressure and a temperature that are equal to $P_c$ and $T_c$, respectively. The term "supercritical" is used herein to refer to a pressure and a temperature which are greater than $P_c$ and $T_c$, respectively.

In the context of the present invention, the critical fluid used in the extraction process is employed at conditions that encompass near-critical, critical, and supercritical temperatures and pressures at various stages of the process. Accordingly, the temperature of the critical fluid can be at least about 0.9 $T_c$, and preferably ranges from about 0.9 $T_c$ to about 1.3 $T_c$. The pressure of the critical fluid can be at least about 0.25 $P_c$, and preferably ranges from about 0.25 $P_c$ to about 10 $P_c$.

Use of the critical fluid in the extraction process allows for efficient separation of the process chemicals from the remediation effluent, with the critical fluid providing a selective extraction/exclusion mechanism for separation of the various components in the recovered process water. The critical fluid such as $CO_2$ can be recycled for reuse in the extraction process without causing a reduction in the extraction efficiency of the process path.

The extraction method employed in the CFE treatment facility 40 is a staged approach to component separation. The primary separation stage requires heating of a critical fluid, such as carbon dioxide or propane, under constant pressure, thereby reducing its density and hence its solvating power. The primary separation stage removes surfactant from the critical fluid solvent. In the second and final stages, pressure is reduced in steps. Stepwise pressure drops provide controlled stagewise rejection of dissolved components from the critical fluid subsequent to solute collection. Following separation and collection, process chemicals (alcohol and surfactant) may be recycled to the groundwater remediation system for reuse, and the critical fluid can be recycled to the extraction/chemical recovery process.

In general, the extraction of contaminants such as DNAPLs or LNAPLs takes place in a high pressure reaction vessel, which is heated to the desired process conditions such as about 15–100° C., and preferably about 20–65° C. Pressures ranging from about 200–3000 psig, (about 1,379–20,684 kPa) and preferably about 300–2700 psig, (about 2,068–18,615 kPa) are utilized in the extraction method of the invention. Multiple temperature and/or pressure adjustments may be employed for selective separation of various solutes, including contaminants and process chemicals, from the critical fluid solvent. The separation of contaminants and process chemicals from the critical fluid may be completed in a total condenser. Later, stagewise temperature and pressure drops can be employed to enact the separation. Critical fluid distillation can also be used for component separation. This distillation can be enacted though multiple stage temperature and/or pressure drops, taking advantage of the differing volatilities of the dissolved components. In the warmer zone, the dissolved components of relatively low volatility will be precipitated and collected. In the cooler zone, the higher volatility compounds will be collected in a similar fashion. A critical fluid distillation column may also be used in component separation.

Breaking of the surfactant/water microemulsion can optionally be used to reduce the volume of effluent requiring critical fluid treatment. Separation of the surfactant from the aqueous phase will result in two separable, immiscible streams. The concentrated organic surfactant phase contains high concentrations of NAPLs (>3000 ppm), surfactant, and alcohol and represents approximately 10% of the total effluent stream. The remaining aqueous stream contains <300 ppm NAPLs, low concentrations of surfactant and alcohol (<1%), and can be treated with granulated activated carbon or other technologies to reduce the dissolved concentration to meet required discharge limits. Separation of surfactant/aqueous phases reduces the volume of concentrated effluent requiring treatment, decreasing the required size of critical fluid processing equipment and hence reducing capital and operating costs associated with the critical fluid process.

Figure 3:
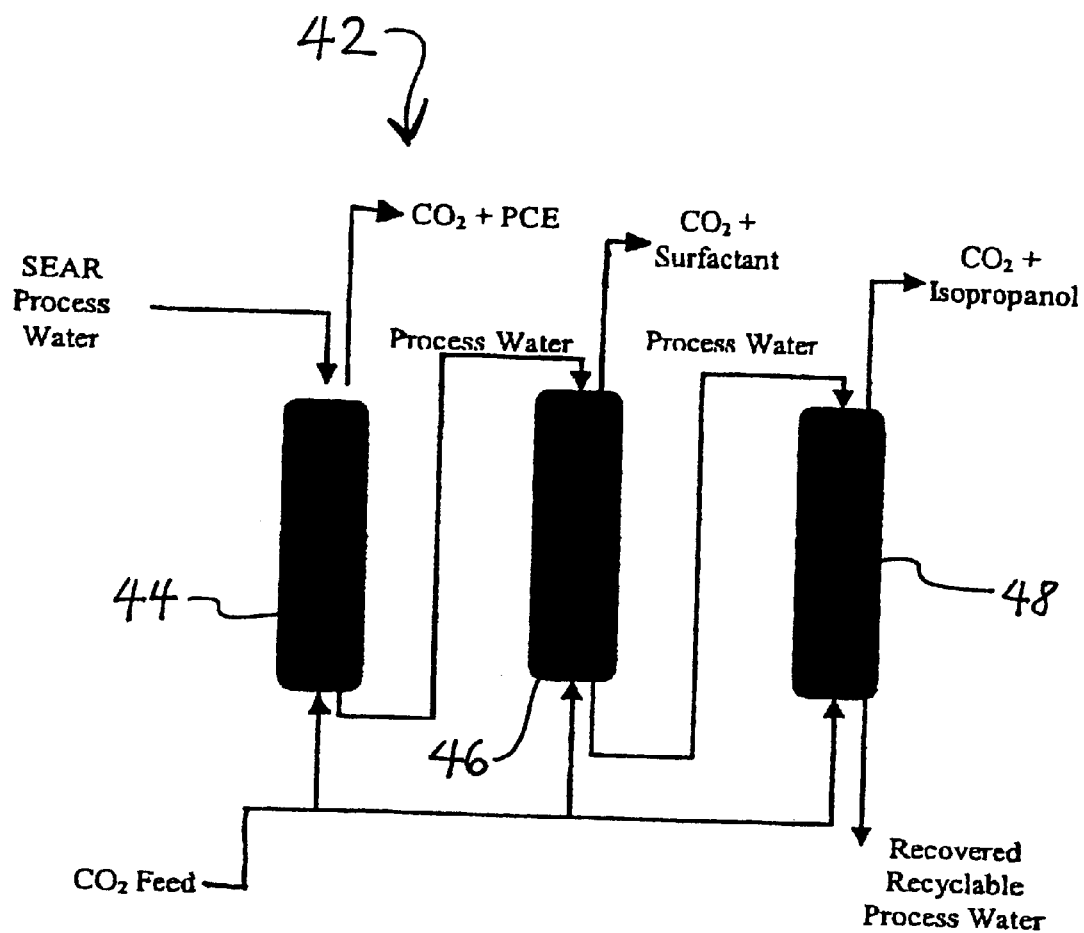
FIG. 3 is a schematic representation of one embodiment of a critical fluid extraction apparatus for performing the extraction method of the present invention for chemical recovery.

FIG. 3 is a schematic representation of one embodiment of a critical fluid extraction apparatus 42 which can be employed in the CFE treatment facility 40 for performing the extraction method for chemical recovery. The extraction apparatus 42 is a series column system which is particularly suited for performing critical fluid extraction of DNAPL such as PCE or TCE, as well as process chemicals, from SEAR or SEAR-NB process effluent. In general, extraction apparatus 42 is a continuous feed critical extraction plant that includes a three vessel, cell, column, or tower extraction cascade in which dissolved components are selectively and sequentially removed and recovered from the SEAR or SEAR-NB process effluent. Concentrated DNAPL is collected and disposed of in a concentrated stream. Following recovery, DNAPL-free surfactant and water can be collected for reuse in the SEAR or SEAR-NB process. The vessel, cell, column, or tower configuration of apparatus 42 having associated process water and critical fluid feed lines is an example of a means for contacting a critical fluid with an aqueous effluent. It will be understood by those skilled in the art that a variety of vessel, cell, column, or tower configurations may be utilized to accomplish this function.

As illustrated in FIG. 3, a first extraction column 44 of apparatus 42 is designed to selectively remove the DNAPL such as PCE or TCE from the aqueous SEAR or SEAR-NB effluent. The extraction column 44 is configured to operate under a pressure of about 1000 psig (about 6,895 kPa) to about 1100 psig, (about 7,575 kPa) and at a temperature of about 20° C. to about 25° C. The critical fluid solvent to process water (aqueous effluent) feed ratios for the separation in column 44 is from about 0.01:1 to about 10:1, with the critical fluid being at near-critical conditions.

During operation of extraction apparatus, 42 the dense aqueous phase of the SEAR or SEAR-NB process water is fed to the top of extraction column 44 and flows downward through column 44. A critical fluid solvent such as $CO_2$ is fed to the bottom of column 44 and due to its relatively low density, the critical fluid will percolate up through the aqueous phase in a countercurrent flow. As the critical fluid travels up through column 44, the DNAPL dissolved in the aqueous phase will dissolve into the critical fluid solvent phase. In effect, the critical fluid will strip DNAPL from the aqueous phase. The concentration of DNAPL in the aqueous phase will be at a minimum at the bottom of column 44, and effluent exiting at the bottom of column 44 will contain only trace concentrations of DNAPL. The DNAPL concentration in the aqueous phase will increase with change in position to a maximum at the top of column 44 near the aqueous stream feed location. The critical, fluid exiting the top of column 44 is separated from the DNAPL rich phase and recovered for continuous reuse in apparatus 42. The DNAPL rich phase represents less than about 1% of the total treated effluent volume and is disposed of as a hazardous waste.

The critical fluid can be removed from column 44 by various conventional pump devices, which are an example of a means for removing the critical fluid from the aqueous effluent. It will be understood by those skilled in the art that a variety of pump configurations and devices may be utilized to accomplish this function.

A second extraction column 46 of apparatus 42 is in fluid communication with column 44 and is designed to selectively remove the surfactant from the aqueous effluent. The extraction column 46 is configured to operate under a pressure of about 1700 psig (about 11,722 kPa) to about 2500 psig, (about 17,238 kPa) and at a temperature of about 20° C. to about 25° C. The critical fluid solvent to process water feed ratios for the separation in column 46 is from about 5:1 to about 10:1, with the critical fluid being at near-critical liquid conditions.

During operation, the process water from the bottom of column 44 enters the top of column 46, flows downward through column 46, and is contacted with the critical fluid such as $CO_2$ in a countercurrent flow similar to column 44. As the critical fluid travels up through column 46, the surfactant dissolved in the process water will dissolve into the critical fluid solvent phase. The concentration of surfactant will be at a minimum at the bottom of column 46, and effluent exiting at the bottom of column 46 will contain only trace concentrations of surfactant. The surfactant concentration will increase with change in position to a maximum at the top of column 46. The critical fluid exiting the top of column 46 is separated from the recovered surfactant and recycled for reuse in apparatus 42. The recovered surfactant is suitable for reuse in subsequent SEAR or SEAR-NB groundwater floods.

A third extraction column 48 of apparatus 42 is in fluid communication with column 46 and is designed to selectively remove alcohol such as ispropanol from the aqueous effluent in an alcohol rich phase. The extraction column 48 is configured to operate under a pressure of about 1700 psig, (about 11,722 kPa) to about 2500 psig, (about 17,238 kPa) and at a temperature of about 30° C. to about 40° C. The critical fluid solvent to process water feed ratios for the separation in column 48 is from about 5:1 to about 10:1, with the critical fluid being at supercritical conditions.

During operation, the process water from the bottom of column 46 enters the top of column 48, flows downward through column 48, and is contacted with the critical fluid such as $CO_2$ in a countercurrent flow similar to the other columns. As the critical fluid travels up through column 48, the alcohol dissolved in the process water will dissolve into the critical fluid solvent phase. The concentration of alcohol will be at a minimum at the bottom of column 48, and effluent exiting at the bottom of column 48 will contain only trace concentrations of alcohol. The alcohol concentration will increase with change in position to a maximum at the top of column 48. The critical fluid exiting the top of column 48 is separated from the recovered alcohol and recycled for reuse in apparatus 42. The recovered alcohol is suitable for reuse in subsequent SEAR or SEAR-NB groundwater floods. The treated process water that exits the bottom of column 48 may also be recycled for reuse in subsequent SEAR or SEAR-NB groundwater floods, or may be directed to a municipal waste treatment facility prior to final discharge.

Although the critical fluid extraction process described above is aimed primarily at extraction of DNAPL and process chemicals from SEAR or SEAR-NB effluent, it may also be used in conjunction with preconcentration techniques such as air stripping and micellular enhanced ultrafiltration (MEUF) to reduce the final volume of material requiring disposal as hazardous waste.

The critical fluid extraction method of the invention provides a viable technology for separation and concentration of hazardous materials and high-value chemicals. The critical fluids may be efficiently employed in aqueous extraction processes where difficult or previously unfeasible separations have been previously encountered. The present invention also provides the benefit that at the completion of treatment of a contaminated site, recovered process chemicals can potentially be used in treatment of subsequent contaminated sites.

The critical fluid extraction method is particularly advantageous in that it presents a viable alternative for waste minimization and volume reduction in handling of SEAR or SEAR-NB process effluent. The chemical recovery and recycle provided by the present method also reduces the environmental impact of the SEAR or SEAR-NB process as less chemicals are used, thereby minimizing the volume of hazardous waste generated. The ability to recover and recycle process chemicals significantly reduces the cost and increases the economic viability of the SEAR or SEAR-NB process. In addition, through continuous recycle of critical fluid solvents applied to the treatment of effluent process water, minimal secondary wastes are generated.

The following examples are given to illustrate the present invention, and are not intended to limit the scope of the invention.

EXAMPLE 1

Experiments are performed to characterize and optimize the critical fluid extraction and separation of DNAPLs (PCE) from a simulated SEAR effluent containing water, sodium dihexyl sulfosuccinate surfactant (CYTEC AEROSOL MA80), and isopropanol (IPA), with $CO_2$ used as the critical fluid. The simulated SEAR effluent is composed of 12% isopropanol, 4% surfactant, and 84% water, with PCE added at a concentration of 3000 ppm. The extraction experiments are completed in triplicate at approximately five temperatures (15, 30, 45, 60, 75° C.) and five approximate pressures 800, 1000, 1200, 1600, 2000 psig, (approximately 5,516, 6,895, 8,273, 11,032, 13,790 kPa) using $CO_2$. With a critical temperature and critical pressure of about 31° C. and about 1070 psi, (about 7378 kPa) respectively, for $CO_2$, the selected reaction conditions represent near-critical, critical, and supercritical conditions.

The experimental extraction system includes two piston pumps (5 ml/min capacity), stainless steel tubing, and a batch extraction cell (~1L) which is a high pressure vessel. The extraction system was constructed using commercially available equipment rated for the pressures and temperatures to be tested. The extraction critical fluid is fed through the feed pump to pressurize the system. Once at the desired operating pressure, preferably about 600–2000 psig, (about 4,137–13,790 kPa) the feed line is valved off. The extraction cell is heated to the desired process condition via an electric heating mantle surrounding the extraction cell. Temperature and pressure within the extraction cell is monitored continuously by resistive temperature devices (RTDs) and electronic pressure transducers.

The experiments employ a staged approach to component separation. The primary separation stage requires heating of the critical fluid under constant pressure, reducing its density and hence its solvating power. The primary separation stage removes the surfactant from the critical fluid solvent. As the surfactant is the least volatile component, it has the lowest solubility in the critical fluid. Heating of the extract stream reduces the density of the critical fluid and hence its solvating power. Thus, reduction of density results in rejection of the low volatility surfactant from the critical fluid while increasing the solubilities of more the volatile IPA and PCE. In the second and third separation stages, temperature and pressure are reduced to enact component separation. In the second stage, IPA is separated from the critical fluid and PCE, followed by separation of PCE from the critical fluid in the third separation stage. Stepwise pressure drops provide controlled stagewise rejection and subsequent collection of the dissolved components from the critical fluid.

The extraction cell contains approximately 50% SEAR effluent by volume during an experimental run. Following contact with effluent water, the critical fluid with dissolved process chemicals and DNAPL are separated from the effluent water, removed from the extraction cell, and passed through a collection zone to drop dissolved materials out of the critical fluid under pressure. The critical fluid then returns to the circulation pump for recycle to the extraction cell.

Samples are withdrawn from the aqueous phase during extraction through a small volume (<0.5 ml) sample loop. The samples are withdrawn from the extraction cell and collected in a cold trap at 15 minute intervals for the first hour of operation, followed by 1 hour intervals for the duration of a 6 hour run. Following collection, the samples are analyzed on a gas chromatograph (GC) to determine respective PCE, isopropanol, and surfactant concentrations.

The PCE is extracted from the 3000 ppm level to a level less than 5 ppm (99.8% removal) after a 2 hour batch extraction. The GC data can be applied in tuning of the process to optimize the extraction and separation steps.

EXAMPLE 2

A simulated process effluent solution was prepared which contained 12% isopropanol, 4% surfactant, and 84% water. PCE was added to the solution at a concentration of 3000 ppm. Process chemical extraction from the simulated process effluent was carried out at about 27° C. and at about 1640 psig (about 11,307 kPa) using a critical fluid of $CO_2$.

Figure 4:
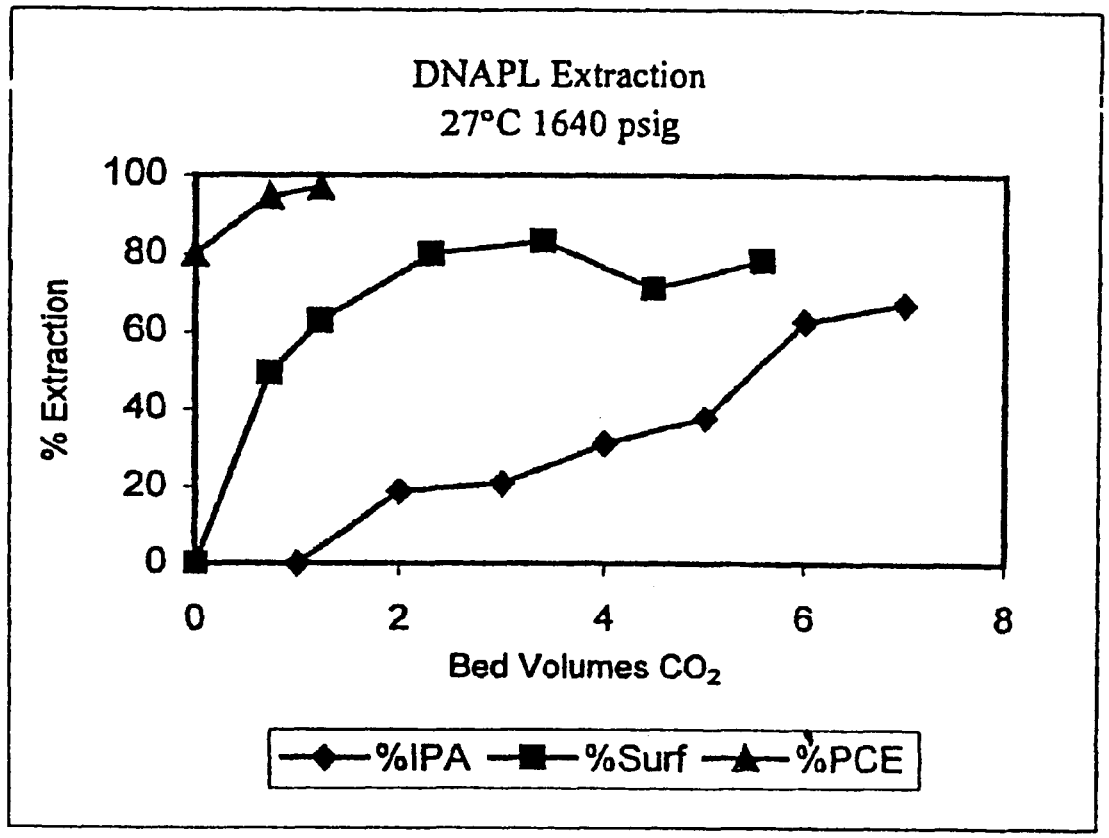
FIG. 4 is a graph showing chemical component extraction as a function of bed volumes of a critical fluid at a given temperature and pressure.

FIG. 4 is a graph of the chemical extraction, which was generated from the measured sample data set forth in Table 1 below. This graph illustrates the removal of PCE in excess of 97%, removal of surfactant greater than 80%, and removal isopropanol greater than 60%, from the effluent solution. In addition, the graph of FIG. 4 illustrates that the rate of extraction of PCE is much higher than that of surfactant or alcohol.

TABLE 1

| Sample | Vol. $CO_2$ | % PCE | % Surfactant | % IPA |
| --- | --- | --- | --- | --- |
| 1 | 0.0 | 80.14329 | 0.001561 | 0 |
| 2 | 0.7 | 94.65778 | 49.50597 | 18.83669 |
| 3 | 1.2 | 97.029 | 62.87148 | 20.97867 |
| 4 | 2.3 |  | 80.18054 | 31.20183 |
| 5 | 3.4 |  | 83.37581 | 37.60529 |
| 6 | 4.5 |  | 71.15732 | 62.53276 |
| 7 | 5.6 |  | 78.44909 | 66.98888 |

EXAMPLE 3

Distribution coefficients were generated in a laboratory using a simulated process effluent solution treated with a $CO_2$ critical fluid. The simulated process effluent solution contained 4% MA80 surfactant, 12% isopropanol, and 84% water. The distribution coefficients indicate what kind of affinity each one of the effluent components has for the $CO_2$ by measuring the concentration of the components in the $CO_2$ and aqueous phases.

To generate the distribution coefficients for the respective chemical components extraction experiments were completed in triplicate at three approximate temperatures (21, 35, 44° C.) and at five approximate pressures 1000, 1600, 2000, 2600 psig (about 6,895, 11,032, 13,790, 17,926 kPa) using $CO_2$. With critical temperature and pressure of about 31° C. and about 1070 psi (about 7,377 kPa) respectively for $CO_2$, the selected reaction conditions represented near-critical to supercritical conditions.

Figure 5:
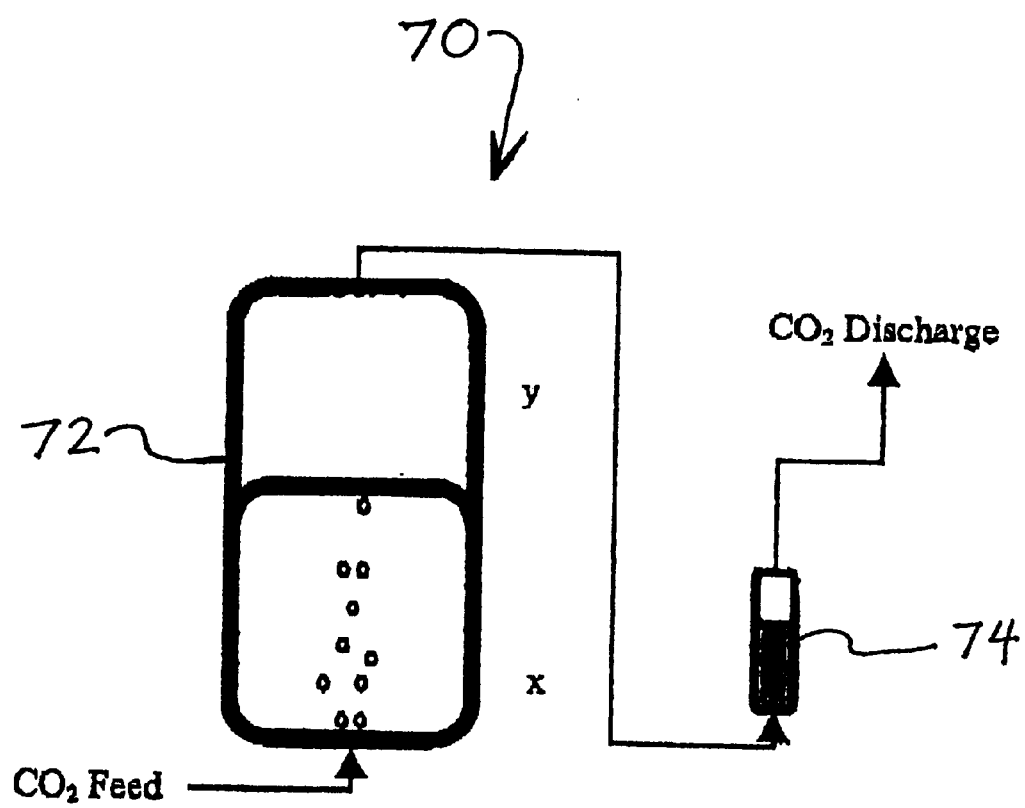
FIG. 5 is a schematic diagram of an apparatus used in performing distribution coefficient experiments.

FIG. 5 is a simplified schematic diagram of an apparatus 70 used in the distribution coefficient experiments. The distribution coefficient experiments were completed using a 300 ml reaction/extraction vessel 72. The $CO_2$ was flowed through vessel 72 at a rate of 1 ml/min. The $CO_2$ exiting vessel 72 was expanded into methanol in a collection vessel 74, where isopropanol and surfactant were collected. PCE was not added to the effluent solution in this series of experiments.

Samples were withdrawn from vessel 72 in 20 minute intervals at $CO_2$ flow rates of 1 ml/min. Following collection, samples dissolved in methanol were analyzed on a gas chromatograph (GC) to determine respective isopropanol and surfactant concentrations. With a known $CO_2$ flow rate and sample duration, the concentration of isopropanol and surfactant in the $CO_2$ phase was calculated. Liquid phase samples were withdrawn from vessel 72 concurrent to $CO_2$ sampling, and concentrations of surfactant and isopropanol were measured directly on the GC.

Distribution coefficients were then calculated as a function of component mass fractions of the various components in the vapor ($CO_2$) and liquid (effluent) phases using equation (1) below.

$$D_i = y_i/x_i \tag{1}$$

where $D_i$ is the distribution coefficient, $y_i$ is the vapor phase mass fraction, and $x_i$ is the liquid phase mass fraction.

Figure 6:
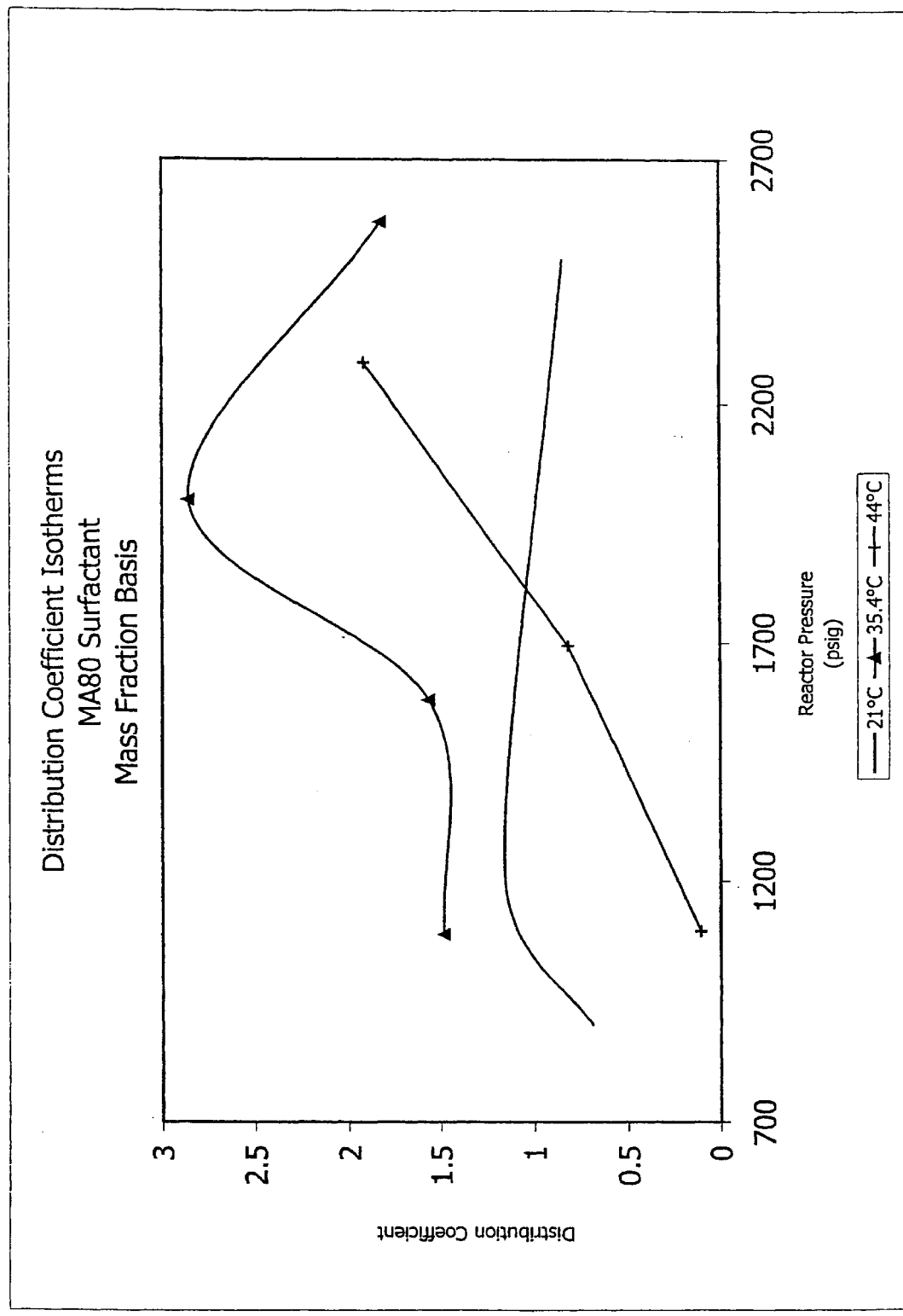
FIG. 6 is a graph showing distribution coefficient isotherms as a function of extractor pressure for a surfactant.
Figure 7:
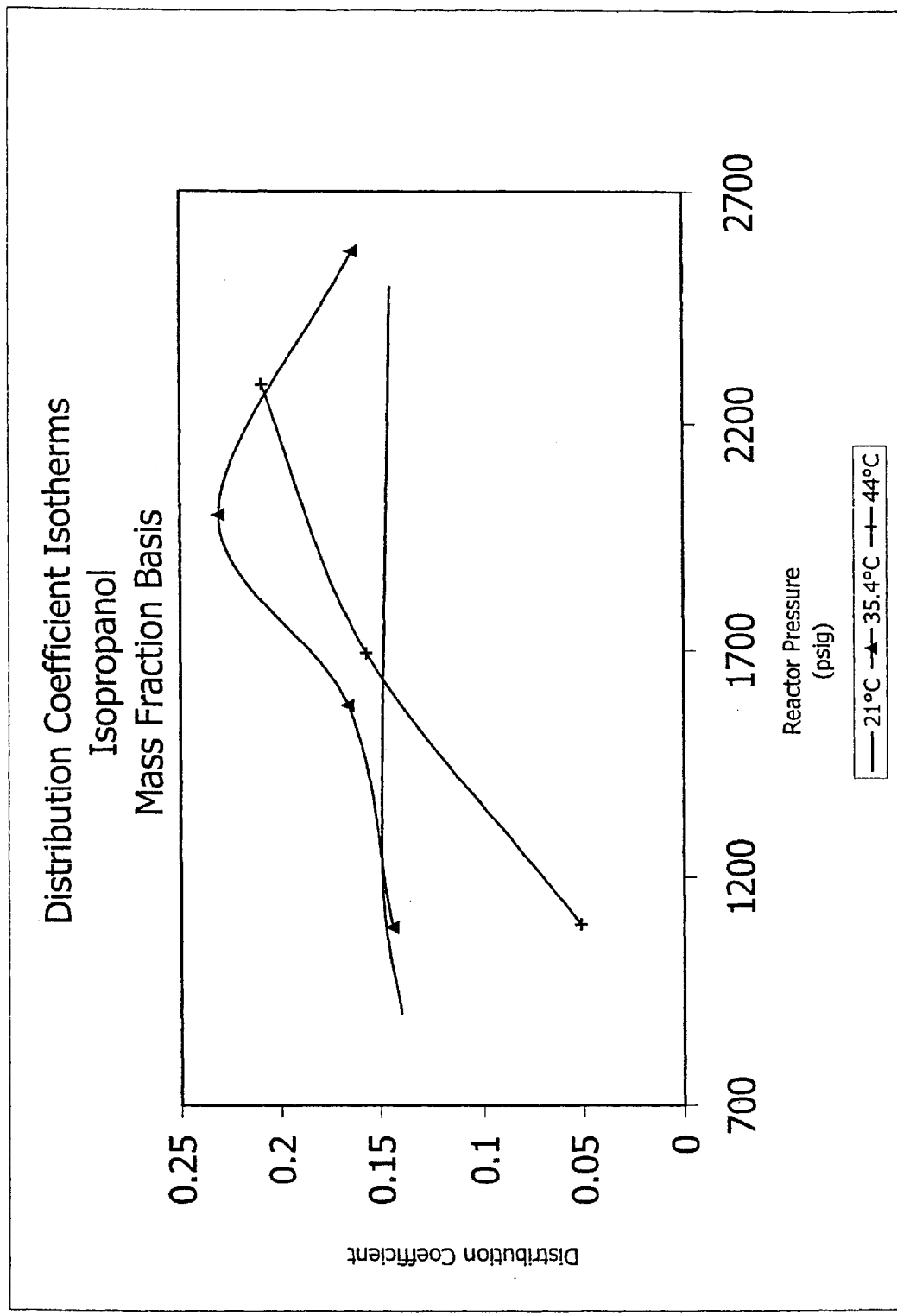
FIG. 7 is a graph showing distribution coefficient isotherms as a function of extractor pressure for an alcohol.

Multiple samples were taken at each condition of temperature and pressure, and a standard deviation for the measurement was recorded. In this manner, curves of distribution coefficient as a function of temperature and pressure were generated. FIG. 6 is a graph showing distribution coefficient isotherms as a function of extractor pressure for the surfactant. FIG. 7 is a graph showing distribution coefficient isotherms as a function of extractor pressure for the isopropanol. These isotherms indicate that isopropanol, with the lowest values of $D_i$ is the most difficult separation to complete.

Because of the large difference in surfactant and isopropanol distribution coefficients, these materials can be easily separated through staged extraction. Because the $D_i$ of the surfactant is higher than that of isopropanol, it is more readily removed from the liquid phase. This indicates that an extraction scheme allowing selective extraction of surfactant and isopropanol from the liquid phase is viable. The distribution coefficient of PCE is orders of magnitude higher than that of isopropanol or surfactant. As such, PCE can be readily selectively removed from the liquid phase. In addition, optimum conditions of temperature and pressure for extraction of the chemicals can be identified through analysis of the distribution coefficients generated. These coefficients demonstrate that PCE and process chemicals can be effectively separated and recovered from a surfactant-enhanced remediation effluent.

EXAMPLE 4

Assuming a typical SEAR effluent composition of 86% water, 0.1% PCE, 8% isopropanol (IPA), and 4% surfactant, the composition of extraction plant effluent fractions can be estimated using distribution coefficients generated in laboratory experiments. Based on this analysis, the PCE rich fraction will constitute approximately 1% of the total flow exiting the extraction plant and will require disposal as a hazardous waste. Recovered process chemicals (surfactant and isopropanol) will account for approximately 13% of the total flow exiting the extraction plant and will be suitable for reuse in the SEAR process. Water, at approximately 86% of the total flow exiting the extraction plant, can be directed to a waste treatment facility for final treatment prior to discharge. Table 2 sets forth the expected composition of organic fractions exiting the extraction plant with a typical feed composition based on laboratory generated distribution coefficients.

TABLE 2

|  | | CFE | Products | |
| --- | --- | --- | --- | --- |
|  | Aqueous Feed Composition | PCE Rich Product | Recovered Chemical | Treated Water |
| PCE | 0.1% | 9% | 0.0001% | 0.0000000% |
| Water | 86% | 6% | 13% | 98.57% |
| IPA | 8% | 37% | 52% | 1.11% |
| Surfactant | 4% | 27% | 24% | 0.28% |
| Other | 2% | 21% | 10% | 0.05% |
| Distribution of Products |  | 1.1% | 13.3% | 85.6% |

As indicated in Table 2, about 1% of the extracted product would be PCE (DNAPL phase), about 13% would be recovered process chemicals (e.g., surfactant and alcohol), and about 86% would be water phase. It should particularly be noted that the treated water would have zero PCE, allowing the water to be recycled or reused without having to be treated as a hazardous waste.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for extraction of chemicals from groundwater remediation aqueous effluent, the method comprising:
   contacting a critical fluid with an aqueous effluent including water and a plurality of chemical components in a first stage at a selected first temperature and first pressure, such that at least one of the chemical components is thereby substantially dissolved in the critical fluid;
   removing the critical fluid, having at least one of the chemical components dissolved therein, from the aqueous effluent; and
   recovering dissolved chemical components from the critical fluid.

2. The method of claim 1, wherein contacting a critical fluid with an aqueous effluent comprises selecting the critical fluid from the group consisting of carbon dioxide, propane, ethane, sulfurhexafluoride, monofluoromethane, trifluoromethane, and combinations thereof.

3. The method of claim 1, wherein contacting a critical fluid with an aqueous effluent comprises selecting the first temperature and first pressure such that the critical fluid is in a near-critical state.

4. The method of claim 1, wherein contacting a critical fluid with an aqueous effluent comprises selecting the first temperature and first pressure such that the critical fluid is in a critical state.

5. The method of claim 1, wherein contacting a critical fluid with an aqueous effluent comprises selecting the first temperature and first pressure such that the critical fluid is in a supercritical state.

6. The method of claim 1, wherein contacting a critical fluid with an aqueous effluent comprises selecting the first temperature to be about 0.9 of a critical temperature of the critical fluid.

7. The method of claim 1, wherein contacting a critical fluid with an aqueous effluent comprises selecting the first temperature to be in a range from about 15° C. to about 70° C.

8. The method of claim 1, wherein contacting a critical fluid with an aqueous effluent comprises selecting the first pressure to be about 0.25 of a critical pressure of the critical fluid.

9. The method of claim 1, wherein contacting a critical fluid with an aqueous effluent comprises selecting the first pressure to be in a range from about 200 psig to about 3000 psig.

10. The method of claim 1, wherein contacting a critical fluid with an aqueous effluent including water and a plurality of chemical components comprises contacting the critical fluid with the aqueous effluent including water and at least one surfactant.

11. The method of claim 10, wherein contacting a critical fluid with an aqueous effluent including water and a plurality of chemical components comprises contacting the critical fluid with the aqueous effluent including water and at least one of a nonionic, cationic or anionic surfactant.

12. The method of claim 10, wherein contacting a critical fluid with anaqueous effluent including water and a plurality of chemical components comprises contacting the critical fluid with the aqueous effluent including water and at least one surfactant selected from the group consisting of nonylphenol ethoxylate, sodium diamyl sulfosuccinate, sodium dihexyl sulfosuccinate, sodium dioctyl sulfosuccinate, derivatives thereof, and combinations thereof.

13. The method of claim 1, wherein contacting a critical fluid with an aqueous effluent including water and a plurality of chemical components comprises contacting the critical fluid with the aqueous effluent including water and an alcohol.

14. The method of claim 13, wherein contacting a critical fluid with an aqueous effluent including water and a plurality of chemical components comprises contacting the critical fluid with the aqueous effluent including water and at least one of isopropanol and ethanol.

15. The method of claim 1, wherein contacting a critical fluid with an aqueous effluent including water and a plurality of chemical components comprises contacting the critical fluid with the aqueous effluent including water and at least one organic contaminant.

16. The method of claim 15, wherein contacting a critical fluid with an aqueous effluent including water and a plurality of chemical components comprises contacting the critical fluid with the aqueous effluent including water and a non-aqueous phase liquid.

17. The method of claim 15, wherein contacting a critical fluid with an aqueous effluent including water and a plurality of chemical components comprises contacting the critical fluid with the aqueous effluent including water and a dense nonaqueous phase liquid.

18. The method of claim 17, wherein contacting a critical fluid with an aqueous effluent including water and a plurality of chemical components comprises contacting the critical fluid with the aqueous effluent including water and at least one chlorinated compound selected from the group consisting of trichloroethylene, perchloroethylene, and mixtures thereof.

19. The method of claim 15, wherein contacting a critical fluid with an aqueous effluent including water and a plurality of chemical components comprises contacting the critical fluid with the aqueous effluent including water and a light nonaqueous phase liquid.

20. The method of claim 19, wherein contacting a critical fluid with an aqueous effluent including water and a plurality of chemical components comprises contacting the critical fluid with the aqueous effluent including water and a material selected from the group consisting of kerosene, jet fuel, diesel fuel, gasoline, motor oil, lubricating oil, cleaning solvents, dry cleaning solvents, and mixtures thereof.

21. The method of claim 1, wherein contacting a critical fluid with an aqueous effluent comprises contacting the critical fluid with an aqueous effluent which is from a contaminated groundwater site that is being treated with a surfactant enhanced groundwater remediation process.

22. The method of claim 1, wherein contacting a critical fluid with an aqueous effluent comprises contacting the critical fluid with an aqueous effluent which is from a contaminated groundwater site that is being treated with a surfactant enhanced groundwater remediation at neutral buoyancy process.

23. The method of claim 1, wherein contacting a critical fluid with an aqueous effluent comprises adjusting at least one of the first temperature and first pressure to a second temperature or a second pressure.

24. The method of claim 23, wherein contacting a critical fluid with an aqueous effluent comprises adjusting the first temperature to not exceed the second temperature, and adjusting the first pressure to not exceed the second pressure.

25. The method of claim 1, wherein contacting the critical fluid with an aqueous effluent comprises contacting the critical fluid with the aqueous effluent in a high pressure vessel.

26. A method for extraction of chemicals from a groundwater remediation aqueous effluent, the method comprising:
    providing at least one well adjacent a groundwater site contaminated with a non-aqueous phase liquid;
    injecting an aqueous solution, including water and a plurality of process chemicals comprising at least a surfactant and an alcohol, into the at least one well so as to contact the non-aqueous phase liquid to render a microemulsion of contaminants and process chemicals;
    removing an aqueous effluent including the microemulsion from the at least one well;
    contacting a critical fluid with the aqueous effluent in a first stage at a preselected first temperature and first pressure such that the contaminants are thereby substantially dissolved in the critical fluid;
    removing the critical fluid having the contaminants dissolved therein from the aqueous effluent;
    removing the critical fluid from the contaminants to concentrate and recover the contaminants;
    contacting additional critical fluid with remaining aqueous effluent in one or more additional stages, with at least one of the first temperature and first pressure being adjusted at each stage, so as to sequentially remove remaining process chemicals from the aqueous effluent along with the additional critical fluid;
    removing the additional critical fluid from the process chemicals to recover the process chemicals; and
    directing the recovered contaminants to a disposal area.

27. The method of claim 26, further comprising recycling the recovered process chemicals and water from the remaining aqueous effluent for reuse in additional aqueous solution to be injected into the at least one well.

28. The method of claim 26, further comprising recycling the removed critical fluids for reuse in contacting additional aqueous effluent from the at least one well.

29. The method of claim 26, wherein injecting an aqueous solution into the at least one well comprises injecting the aqueous solution into at least one injection well.

30. The method of claim 26, wherein removing an aqueous effluent including the microemulsion from the at least one well comprises removing the aqueous effluent including the microemulsion from at least one recovery well.

31. A system for extraction of chemicals from a groundwater remediation aqueous effluent, comprising:
    a groundwater remediation system comprising:
    a process chemical feed and a process water feed;
    an injection system in fluid communication with the chemical feed and the process water feed;
    at least one well adjacent a contaminated groundwater site, the at least one well in fluid communication with the injection system; and
    a critical fluid extraction treatment facility configured to receive an aqueous effluent including water and a plurality of chemical components from the at least one well, wherein the chemical components comprise at least one process chemical and at least one contaminant, the extraction treatment facility comprising:

at least one extraction cell for contacting a critical fluid with the aqueous effluent in a first stage at a preselected first temperature and first pressure such that at least one of the chemical components is thereby substantially dissolved in the critical fluid, for removing the critical fluid, having at least one of the chemical components dissolved therein, from the aqueous effluent, and for contacting additional critical fluid with remaining aqueous effluent in one or more additional stages, with at least one of the first temperature and first pressure being adjustable at each stage, so as to sequentially remove and recover each of the chemical components from the aqueous effluent at each stage.

32. The system of claim 31, further comprising pumping and recycling the recovered process chemicals to the process chemical feed.

33. The system of claim 31, further comprising recycling recovered water from the remaining aqueous effluent to the process water feed.

34. The system of claim 31, further comprising recycling the removed critical fluid for reuse in contacting additional aqueous effluent from the recovery well.

35. The system of claim 31, wherein the at least one well comprises at least one injection well in fluid communication with the injection system and at least one recovery well.

* * * * *